No. 755,170. PATENTED MAR. 22, 1904.
J. E. REED.
SNOW BICYCLE.
APPLICATION FILED OCT. 20, 1903.
NO MODEL.

Witnesses.
A. H. Opsahl.
E. H. Kelster

Inventor
John E. Reed
By his Attorneys.
Williamson & Merchant

No. 755,170. Patented March 22, 1904.

UNITED STATES PATENT OFFICE.

JOHN E. REED, OF BESSEMER, MICHIGAN.

SNOW-BICYCLE.

SPECIFICATION forming part of Letters Patent No. 755,170, dated March 22, 1904.

Application filed October 20, 1903. Serial No. 177,728. (No model.)

*To all whom it may concern:*

Be it known that I, JOHN E. REED, a citizen of the United States, residing at Bessemer, in the county of Gogebic and State of Michigan, have invented certain new and useful Improvements in Snow-Bicycles; and I do hereby declare the following to be a full, clear, and exact description of the invention, such as will enable others skilled in the art to which it appertains to make and use the same.

My invention has for its object to provide an improved runner attachment for bicycles, whereby the bicycles are adapted to run over ice or snow.

To the above ends the invention consists of the novel devices and combinations of devices hereinafter described, and defined in the claim.

The invention is illustrated in the accompanying drawings, wherein like characters indicate like parts throughout the several views.

Figure 1:
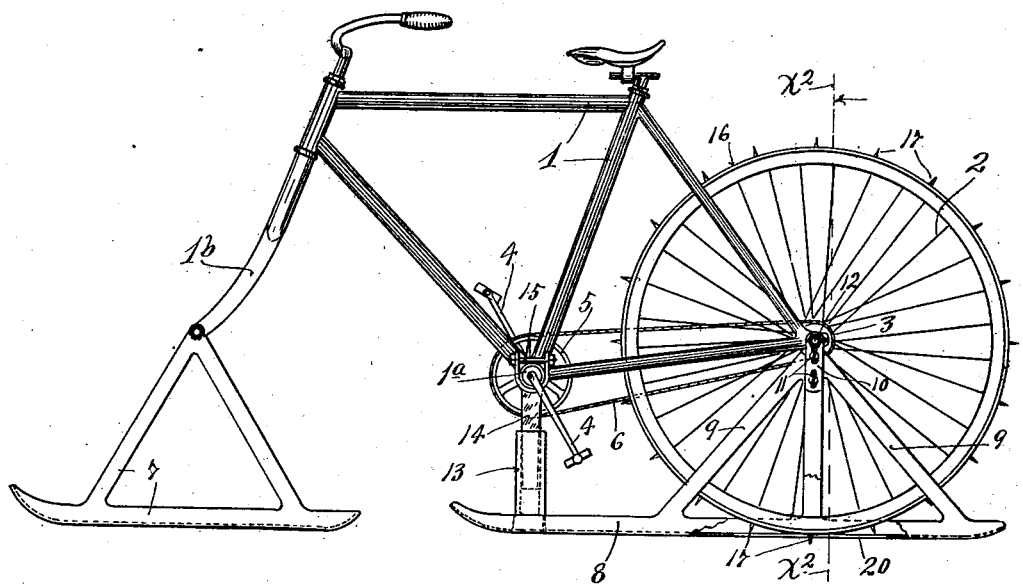
Figure 3:
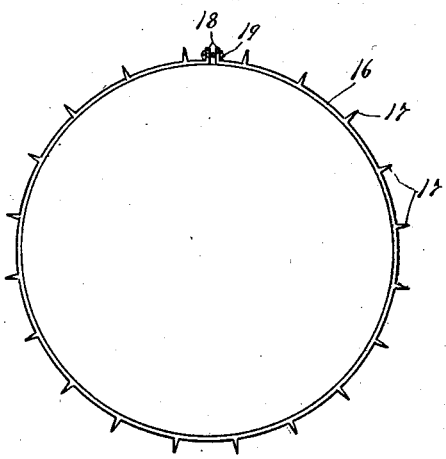
Figure 2:
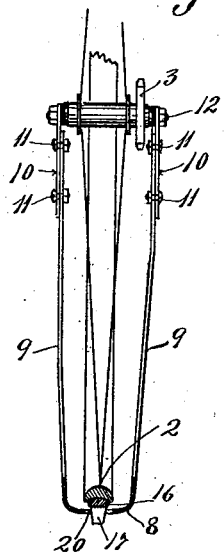

Figure 1 is a side elevation, with some parts broken away, showing a bicycle equipped with my improved runner attachments. Fig. 2 is a transverse vertical section on the line $x^2 x^2$ of Fig. 1; and Fig. 3 is a detail in side elevation, showing the toothed propelling-tire removed from the traction-wheel of the bicycle.

The numeral 1 indicates the frame, and the numeral 2 the rear or traction wheel of the bicycle, which traction-wheel carries a sprocket 3.

The numeral 4 indicates the pedal crank-shaft, mounted in the usual way on the crank-shaft hanger $1^a$ and provided with a sprocket 5, over which and the sprocket 3 runs a sprocket-chain 6 to impart the driving movement to the traction-wheel 2 in the usual way.

A suitable runner 7 is pivotally connected to the front fork $1^b$, the front wheel of the bicycle being of course first removed. This front runner may be of any suitable form and may be connected to the front fork in any suitable way so far as my present invention is concerned.

My invention is directed chiefly to the rear runner and to the arrangement of a toothed driving-tire placed on the rear traction-wheel and arranged to work through a slot or opening in the bottom of the said rear runner. This rear runner 8 is of channel-like form and at its sides is provided with upright brackets 9, formed each by several arms that converge upwardly and are united at their upper ends. To the upper ends of these brackets 9 extension-straps 10 are adjustably secured by a slot-and-bolt connection 11. The upper ends of the straps 10 are perforated, so that the spindle-bolt 12, upon which the rear wheel 3 is mounted, may be passed therethrough to secure said straps to the rear end forks of the frame 1. Near its forward end the runner 8 is provided with a vertical socket or sheath 13, in which works loosely the depending flat stem of a yoke 14, which yoke is rigidly secured to the crank-shaft hanger $1^a$ and is clamped onto the same by a nutted bolt 15. The engagement of the stem of the yoke 14 with the sheath 13 holds the forward end of the runner 8 in position laterally, but permits the same to rock slightly but freely on the bolt 12 as a pivot.

The pneumatic tire of the rear wheel 2 should be removed, and then a metallic tire 16, having projecting teeth 17, is substituted therefor. To clamp this tire 16 onto the rim of the rear wheel, its ends are bent laterally to form ears 18, and a short nutted bolt 19 is passed through perforations in said ears, as shown in Fig. 3. In some cases the toothed tire might be applied to the outside of the pneumatic tire; but advisedly the pneumatic tire should be removed. The teeth 17 of the tire 16 must engage with the road-bed or with the ice or snow over which the machine is run, and to permit this engagement the runner 8 is formed in its bottom with a slot 20 of such width and length as to permit clearance of the said teeth. The runner 8 is adjusted with respect to the wheel 2 and toothed tire carried thereby, so as to throw the teeth 17 into proper engagement with the road-bed by adjusting the straps 10 on the brackets 9.

The device described is of small cost, may be very easily applied to a bicycle, and adapts the same to run either over ice or packed snow. The runner 8 and the side brackets 9 may be stamped from a single flat plate of metal, which is thereafter bent to the proper form.

What I claim, and desire to secure by Letters Patent of the United States, is as follows:

The combination with the frame, rear traction-wheel and driving-gear of a bicycle, of a runner applied to the front fork of said frame, the rear runner 8 having the side brackets 9, sheath 13 and slot 20, the straps 10 pivoted to the rear forked ends of said frame and adjustably secured to said brackets 9 the yoke 14 applied to the crank-shaft hanger of said frame and having a stem telescoping within said sheath 13, and the detachable toothed tire 16 applied to the rear traction-wheel with its teeth 17 arranged to work through the slot 20 of said runner 8, substantially as described.

In testimony whereof I affix my signature in presence of two witnesses.

JOHN E. REED.

Witnesses:
 LOUIS W. MUNTHI,
 JENN JAHNSAN.